United States Patent
Wood et al.

(10) Patent No.: US 6,877,863 B2
(45) Date of Patent: Apr. 12, 2005

(54) AUTOMATIC KEYSTONE CORRECTION SYSTEM AND METHOD

(75) Inventors: John S. Wood, Morgan Hill, CA (US); Robert L. Taber, Santa Clara, CA (US); Gopal Ramachandran, Los Gatos, CA (US)

(73) Assignee: Silicon Optix Inc., San Jose, CA (US)

( * ) Notice: Subject to any disclaimer, the term of this patent is extended or adjusted under 35 U.S.C. 154(b) by 0 days.

(21) Appl. No.: 10/461,319

(22) Filed: Jun. 12, 2003

(65) Prior Publication Data

US 2004/0036844 A1 Feb. 26, 2004

Related U.S. Application Data

(60) Provisional application No. 60/388,001, filed on Jun. 12, 2002.

(51) Int. Cl.$^7$ .......................... G03B 21/14; G03B 21/00
(52) U.S. Cl. ............................ 353/70; 353/69; 353/42; 353/122
(58) Field of Search ........................... 353/69, 70, 42, 353/122, 121

(56) References Cited

U.S. PATENT DOCUMENTS

| | | | |
|---|---|---|---|
| 5,795,046 A | 8/1998 | Woo | |
| 5,883,476 A * | 3/1999 | Noguchi et al. | 315/368.12 |
| 6,305,805 B1 * | 10/2001 | Liebenow | 353/69 |
| 6,367,933 B1 * | 4/2002 | Chen et al. | 353/69 |
| 6,416,186 B1 | 7/2002 | Nakamura | |
| 6,516,151 B2 | 2/2003 | Pilu | |
| 6,520,646 B2 | 2/2003 | Rodriguez, Jr. et al. | |
| 6,520,647 B2 * | 2/2003 | Raskar | 353/70 |
| 2002/0051095 A1 | 5/2002 | Su | |

* cited by examiner

*Primary Examiner*—Judy Nguyen
*Assistant Examiner*—Andrew Sever
(74) *Attorney, Agent, or Firm*—Charles E. Bruzga; Bruzga & Associates (57) ABSTRACT

A projector assembly and method for automatically correcting keystone distortion includes an image correction engine, a light engine, a projection lens having a projection axis, a processor, a directional sensor and an inclination sensor. The sensors determine the absolute vertical and horizontal direction of the projection axis. The inclination sensor determines the vertical zero reference. The direction sensor is used to determine the horizontal zero reference. The processor calculates vertical and horizontal difference angles between the absolute directions and zero reference values in the vertical and horizontal directions. Using difference angles, the processor calculates the keystone distortion and instructs the image correction engine to apply geometric and brightness correction to the image data proportional and inverse to the keystone distortion and lens parameters (field of view, focal length, imperfections, etc) such that the image projected onto a viewing screen, is free from keystone distortion.

14 Claims, 9 Drawing Sheets

FIG. 1 (PRIOR ART)

DESIRED IMAGE

FIG. 2A

IMAGE AS PROJECTED

FIG. 2B

DESIRED IMAGE

FIG. 3A

IMAGE AS PRE-COMPENSATED

FIG. 3B

EFECT OF KEYSTONE DISTORTION ON PRE-COMPENSATED IMAGE

FIG. 3C

IMAGE AS SEEN BY VIEWER

DESIRED IMAGE

IMAGE AS PROJECTED

Distortion correction map concatenating keystone distortion correction for off-axis projection with correction for a curved screen

AUTOMATIC KEYSTONE CORRECTION SYSTEM AND METHOD

This application claims the benefit under 35 U.S.C. 119(e) of U.S. Provisional Application No. 60/388,001, filed Jun. 12, 2002.

FIELD OF THE INVENTION

This invention relates to the field of data and video projection and more particularly to the removal of keystone distortion from a projection image.

BACKGROUND OF THE INVENTION

Computer graphic and video projection devices have become commonplace and are in widespread use. Millions of business users are already using projection devices, and it is anticipated that additional millions of units will be used to provide entertainment viewing in the residential market. All so-called Front Projection Systems consist of a projection device that emits light, and a projection surface upon which this emitted light is reflected so that it may be viewed by the audience. Except in very unusual cases, the projection device, and the projection surface are two separate objects that may be oriented differently with respect to each other.

Figure 1:
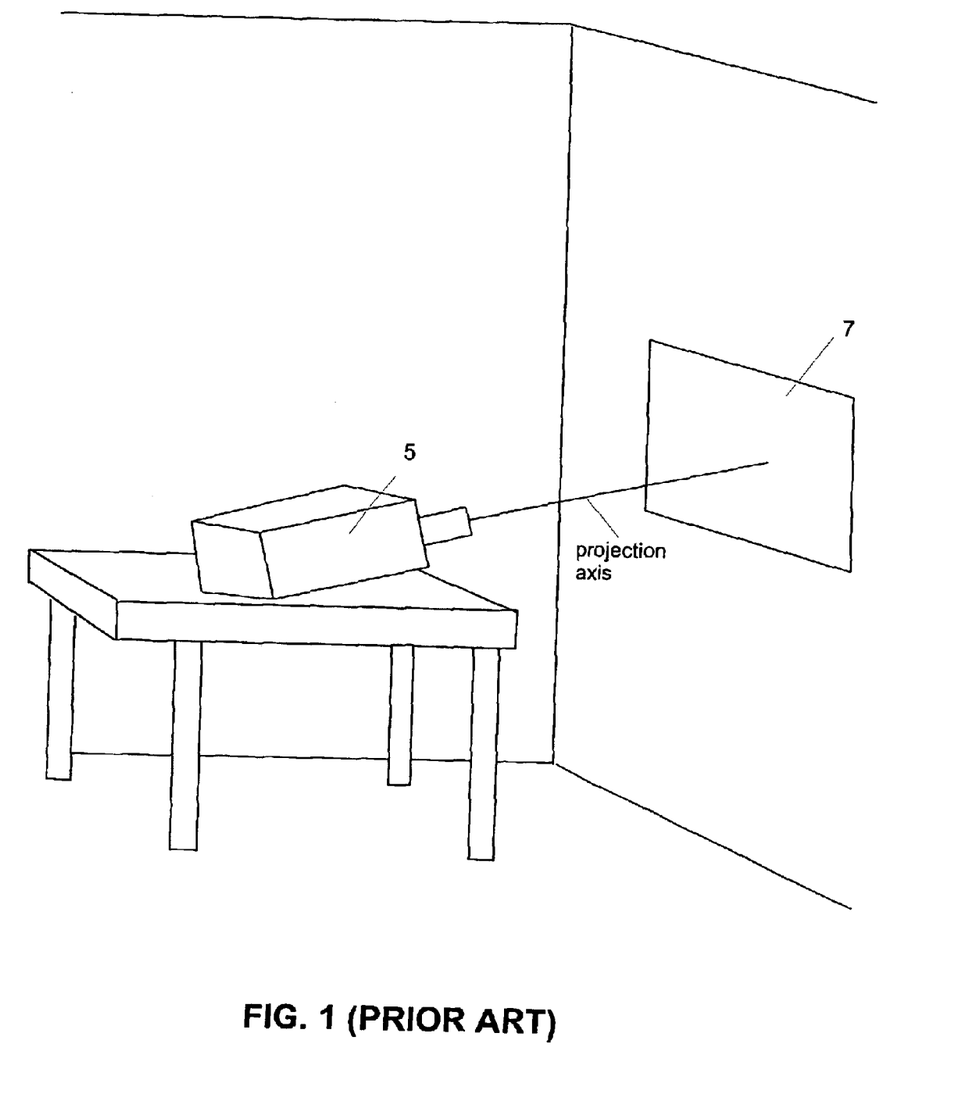
FIG. 1 is a schematic diagram of a conventional prior art projection system with projection device and projection surface.
Figure 2A:
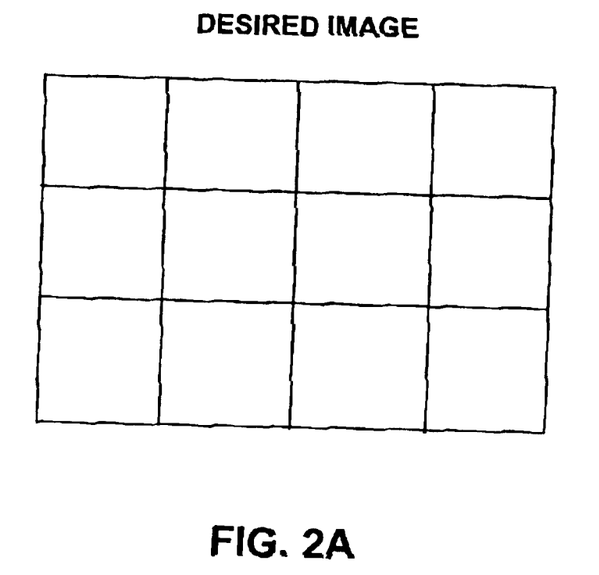
FIGS. 2A and 2B are graphical representations illustrating a desired image and an image affected by vertical keystone distortion, respectively.
Figure 2B:
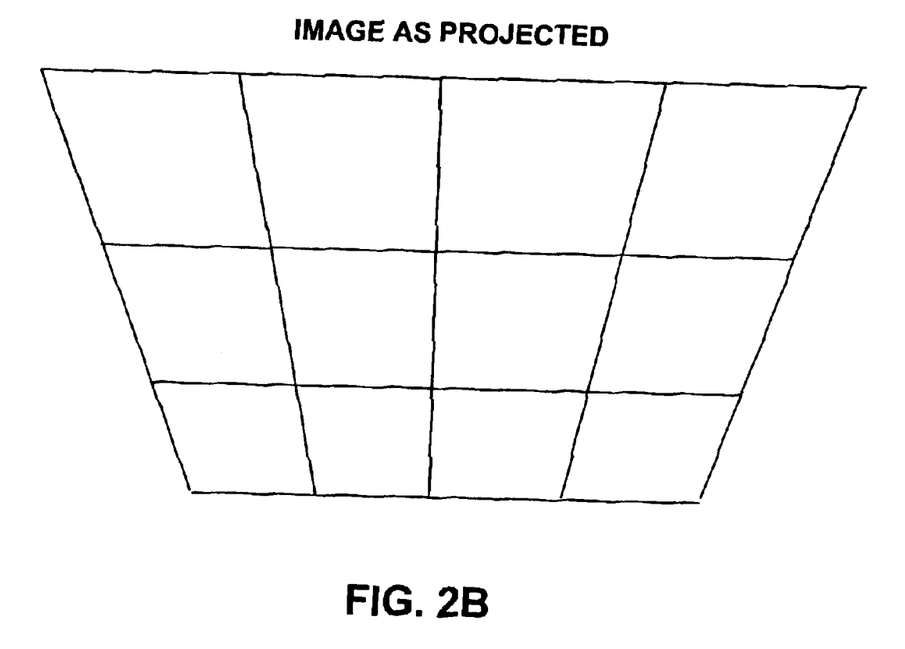

FIG. 1 is a schematic diagram of a prior art projection system. As shown, a projection device 5 is often mounted on a tabletop, and the surface of a nearby wall is used as a projection surface 7. Since the desired direction of the projected image for optimum viewing is centered at a point above the table, the projection device 5 is generally mounted on the table top in such a fashion that the axis of projection is inclined with respect to the plane of a flat table top as shown. The axis of projection is therefore not vertically perpendicular (normal) to the projection surface 7 as implemented by the wall. This off-axis vertical projection causes the top of the image, which is at a greater distance from the projection device than the bottom of the image, to subtend a larger portion of the projection surface than the bottom of the image in comparison to the input image as shown in FIGS. 2A and 2B resulting in vertical keystone distortion in the image. This type of visual distortion of the image commonly referred to in the video products industry as keystone distortion, because the trapezoidal shape of the resultant image is reminiscent of a keystone found in an arch.

Figure 3A:
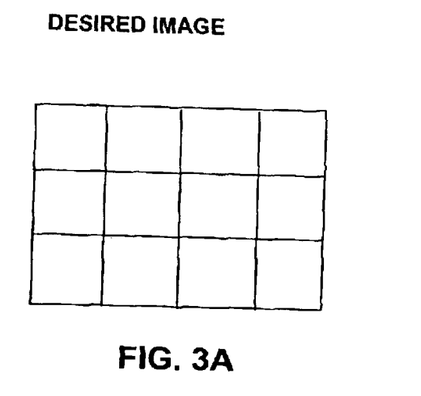
FIGS. 3A to 3D are graphical representations showing the effect of a prior art vertical keystone correction method that uses pre-compensation techniques.
Figure 3B:
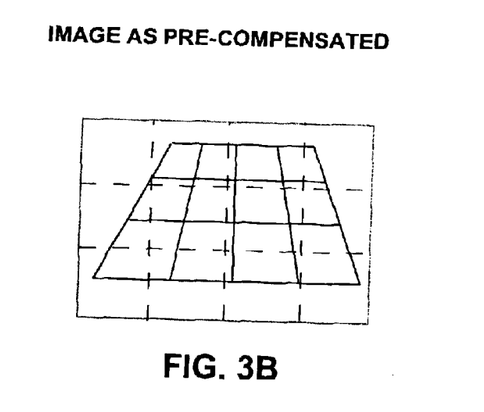
Figure 3C:
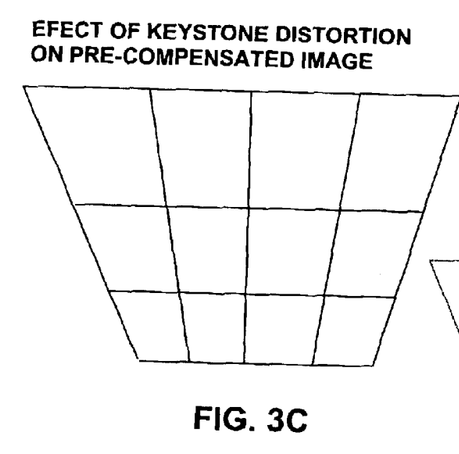
Figure 3D:
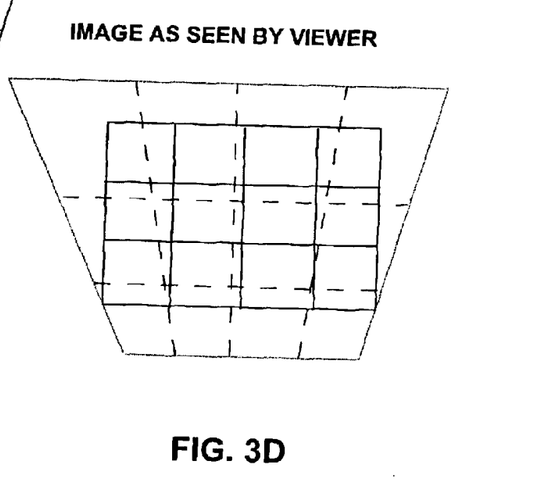

FIGS. 3A to 3D are graphical representations showing the effect of a prior art vertical keystone correction method that uses pre-compensation techniques to achieve keystone correction in the vertical dimension. The conventional technique used to correct keystone distortion (keystone effect as shown in FIG. 3C) pre-compensates for keystone distortion by proportionately shrinking the lines at the top of the image, and expanding the lines at the bottom of the image as shown in FIG. 3B. The image in FIG. 3A is reproduced in dotted outline in FIG. 3B to show the relationship between the respective images. Typically the user adjusts the pre-compensation device with a slider control that increases or decreases the amount of keystone correction. The user's subjective impression that the keystone distortion has been neutralized (see FIG. 3D) is a critical part of the quality of the keystone correction. The image of FIG. 3C is reproduced in dotted outline in FIG. 3D to show the relationship between the respective images. Since there is only a single degree of freedom in a system that does keystone correction in the single vertical dimension (i.e. in the vertical direction), it is a relatively simple thing for a user to judge when keystone distortion had been properly corrected. However, this kind of manual keystone correction requires that the user be aware of keystone distortion, be aware that a keystone correction method exists, and understand or immediately become familiar with the projection device's keystone correction mechanism, and then properly perform keystone correction.

Figure 4:
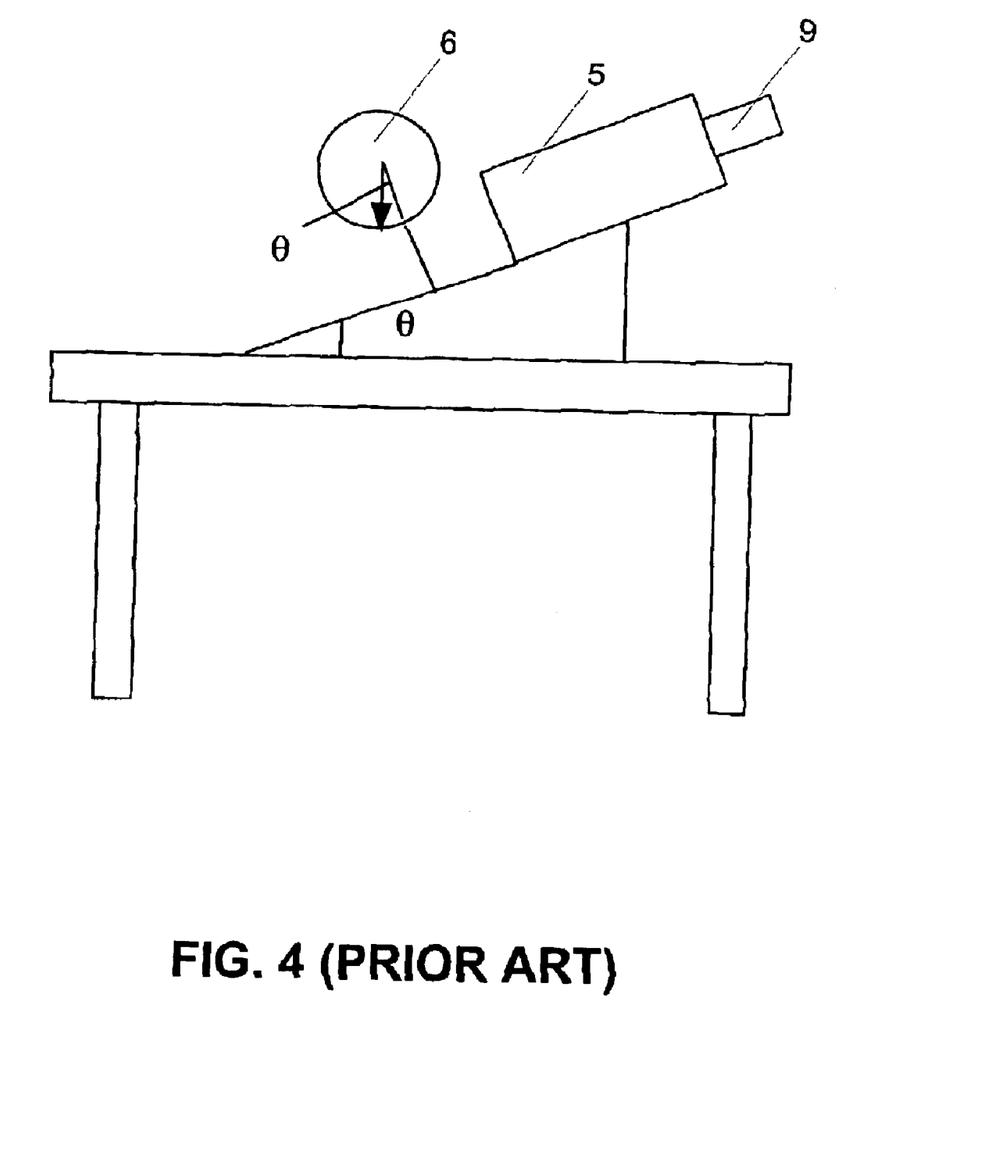
FIG. 4 is a schematic diagram illustrating another prior art correction method of establishing a zero reference for vertical keystone correction.

FIG. 4 is a schematic diagram illustrating the prior art inclination sensor method of establishing a zero reference and projection direction, with respect to the projection screen, for vertical keystone correction. Since the amount of keystone correction required in a system is only dependent on the angle of the axis of projection with respect to the normal vector of the projection surface, keystone correction may be automatically and optimally applied without user intervention as long as this angle is known. Systems which perform automatic keystone correction in only the vertical direction can utilize an inclination sensor to determine the angle of the axis of projection with respect to a zero reference in the vertical dimension. The zero reference in the vertical dimension for a typical vertical mounted projection screen is taken to be the vector of acceleration due to gravity. One possible method, for performing this operation is to affix an accelerometer 6 to the same surface that mounts the projection lens 9 as shown in FIG. 4. The accelerometer 6 thus measures the angle of the axis of projection with respect to acceleration due to gravity. The normal vector of the projection surface is then assumed to be always perpendicular to this zero reference, which is a generally valid assumption for a projection surface consisting of a wall and/or screens mounted on a wall.

SUMMARY OF THE INVENTION

The invention provides in one aspect, a projection method for correcting keystone distortion within an optical image that is projected onto a projection surface through a projection lens having a projection axis that is oriented in a direction that is off-axis from the surface normal of the projection surface, said projector method comprising the steps of:

(a) receiving input image data representing the optical image;

(b) determining the absolute horizontal direction of the projection axis, the absolute vertical direction of the projection axis, a vertical zero reference and a horizontal zero reference;

(c) calculating the vertical difference angle by subtracting the vertical zero reference from the absolute vertical direction of the projection axis and the horizontal difference angle by subtracting the horizontal zero reference from the absolute horizontal direction of the projection axis;

(d) determining the keystone distortion based on the vertical difference angle and the horizontal difference angle; and (e) applying geometric correction to the image data proportional and inverse to said keystone distortion such that the projected image is free from keystone distortion.

In another aspect, the invention provides a projector assembly for correcting keystone distortion within an optical image that is projected onto a projection surface based on image data, said projector assembly comprising:

(a) a projection lens having a projection axis that is oriented in a direction that is off-axis from the surface normal of the projection surface;

(b) an inclination sensor coupled to the projection lens in a fixed manner for measuring the absolute vertical direction of the projection axis and a vertical zero reference and a directional sensor coupled to the projection lens and to the inclination sensor in a fixed manner for measuring the absolute horizontal direction of the projection axis;

(c) an input device for receiving a horizontal zero reference;

(d) a processor coupled to said directional sensor, said inclination sensor, and aid input device, said processor being adapted to determine the vertical difference angle by calculating the difference between the absolute vertical direction of the projection axis and the vertical zero reference and the horizontal difference angle by calculating the difference between the absolute horizontal direction of the projection axis and the horizontal zero reference and for calculating the keystone distortion based on the vertical difference angle and the horizontal difference angle;

(e) an image correction engine applying geometric and brightness correction to the image data proportional and inverse to said keystone distortion such that the projected image is free from keystone distortion.

Further aspects and advantages of the invention will appear from the following description taken together with the accompanying drawings.

DETAILED DESCRIPTION OF THE INVENTION

Figure 5A:
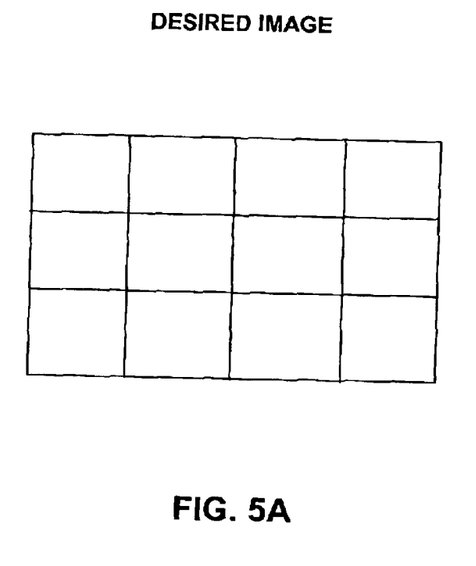
FIGS. 5A and 5B are graphical representations of a desired image and a projected image having horizontal keystone distortion.
Figure 5B:
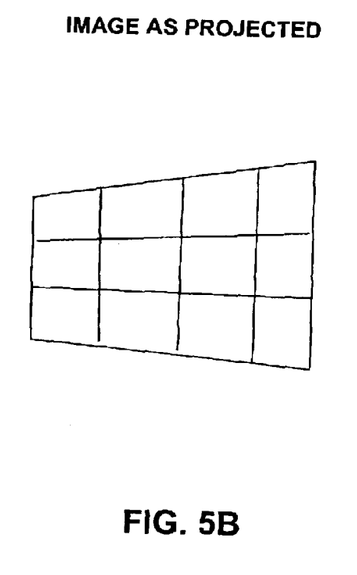

As previously discussed, conventional keystone correction projectors are concerned only with the effect of keystone distortion in a single, vertically oriented dimension. In the prior art tabletop configuration shown in FIG. 1, it is desirable to incline the axis of projection to raise the projected image above the plane of the table top. It is also highly desirable to be able to mount the projector 5 in such a fashion that the angle of the axis of projection in the horizontal dimension may be varied with respect to the normal vector of the projection surface. If the projector 5 is so mounted, the user is free to position the projector 5 almost anywhere in a given space. If the projector 5 is mounted such that it axis of projection is not perpendicular to the screen 7 in the horizontal direction but that its axis of projection is perpendicular to acceleration due to gravity in the vertical dimension (i.e. the axis of projection is in the plane of a flat tabletop), then the characteristic projected keystone distortion shape as illustrated in FIGS. 5A and 5B.

The general manually operated keystone correction pre-compensation method discussed above can be adapted to correct for horizontal-based keystone distortion. That is, the user may apply keystone correction manually, using slider control, with the above-mentioned limitations. Specifically, the user must be aware of the presence of keystone distortion, the existence of keystone correction, the workings of the projector's keystone correction controls and the user must be proficient in achieving subjective keystone correction. However, the method detailed above for sensing the angle of the axis of projection with respect to a zero reference of the vector of acceleration due to gravity by using an accelerometer and applying an automatic keystone correction cannot be used. Since the vector of acceleration due to gravity is orthogonal to all cases of horizontally oriented keystone distortion, another method must be found for establishing a zero reference related to the normal vector of the projection surface.

Figure 6A:
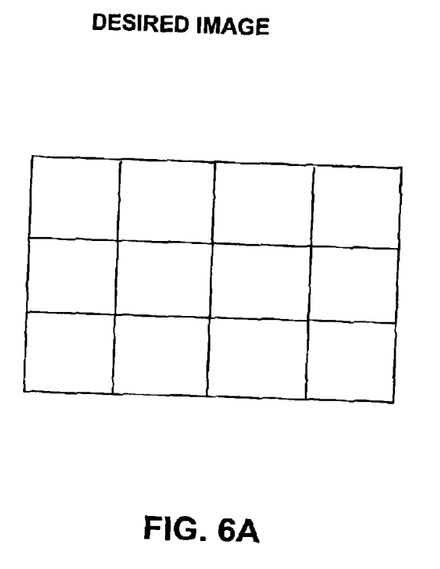
FIGS. 6A and 6B are graphical representations of a desired image and a projected image having both vertical and horizontal keystone distortion.
Figure 6B:
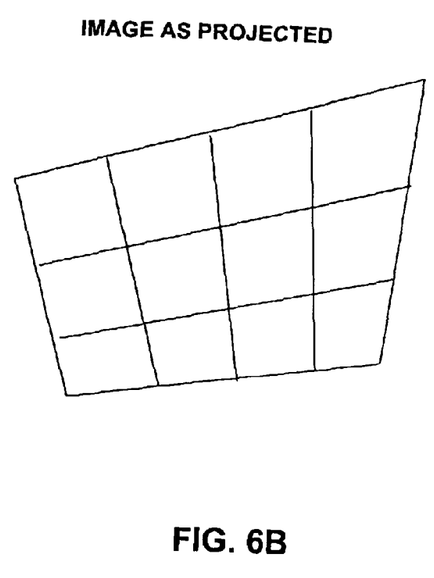

An even more complex challenge lies in the combination of keystone distortion in the horizontal and vertical directions. The appearance of uncorrected keystone distortion in two dimensions, together with two simultaneous degrees of freedom of correction provided by manual keystone correction apparatus, produces a substantially complex keystone effect. Specifically, when both dimensions of keystone distortion are present simultaneously, the characteristic trapezoidal shape that is the namesake of keystone distortion degenerates into an irregularly shaped quadrilateral as shown in FIGS. 6A and 6B. This two dimensional and simultaneous distortion presents the user of manual keystone correction with great difficulty. Not only must the user be aware of keystone distortion, keystone correction, and the projection system's keystone controls, but the user must also be possessed of a high degree of skill in operating these controls. Distortion in two dimensions and manual compensation using two separate compensation means can generate unpredictable results, and is likely frustrate the attempts of the novice user to perform a manual keystone correction.

Figure 7:
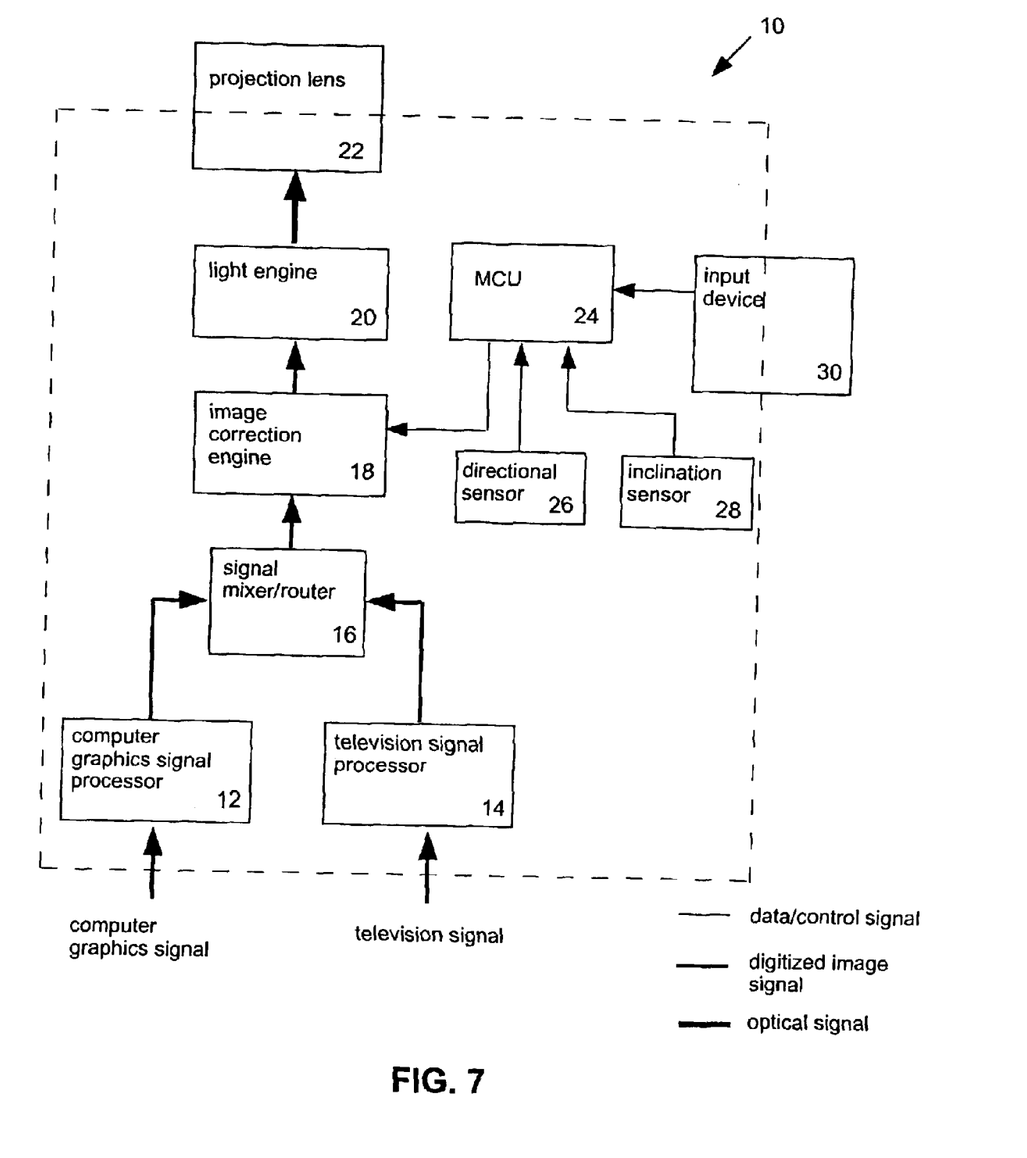
FIG. 7 is a block diagram of the keystone correction projector of the present invention.

FIG. 7 is a block diagram representation of a keystone correction projector 10 built in accordance with the present invention. Correction projector 10 provides automatic keystone correction for an image that is projected at a screen off-axis both vertically and horizontally. Correction projector 10 comprises, a computer graphics signal processor 12, a television signal processor 14, a signal router/mixer 16, an image correction engine 18, a light engine 20, a projection lens 22, a microcontroller unit (MCU) 24, a directional sensor 26, an inclination sensor 28, and an input device 30.

Computer graphics signal processor 12 and television signal processor 14 receive image data from a computer graphics data source or a television source. Although these two types of signals are processed in a significantly different way, in both cases the result is a digitized representation of moving picture sequences. These digitized signals are then mixed and/or multiplexed by signal router/mixer 16 to produce the desired digitized image signal. While only one computer graphics input and one television input are shown, it should be understood that the basic concept can be extended to any number of any other type of input sources. Also, additional image processing may be performed on the resultant signals by signal router/mixer 16.

Image correction engine 18 receives the digitized image signal from signal router/mixer 16 and applies keystone correction pre-compensation to the digitized image signal. Specifically, image correction engine 18 forms a pre-compensated image by applying a specific image warping function to the digitized image signal. As is known, image warping consists of digitally scaling an image on a spatially selective basis. In this case, the image warping function contracts the image in sections of the image where keystone distortion expands the projected image as seen by the user. The degree of image contraction is designed to perfectly compensate for the local expansion of keystone distortion. It should be understood that other types of image geometry correction (e.g. pre-compensation for image distortions introduced by the projection lens 22) can be simultaneously applied by the image correction engine 18. Keystone distortion also causes variations of image brightness in the projected image due to the expansion of the projected area and reduced light density. These variations in image brightness can also be corrected by the image correction engine 18 at the same time.

The nature of two-dimensional keystone distortion is such that it can be generally described by two quantities: 1) the angle of the axis of projection with respect to the normal vector of the projection surface in a vertically oriented plane which is defined herein as the vertical difference angle; and 2) the angle of the axis of projection with respect to the normal vector of the projection surface in a horizontally oriented plane which is herein defined as the horizontal difference angle. While the horizontal and vertical are the easiest practical planes to work with and are accordingly discussed here, it should be understood that more generally two angles from any two planes which are orthogonal to each other can be used to at least partially describe keystone distortion. It should also be noted that keystone distortion can also be characterized by other parameters of the projector (e.g. field of view of the lens, the size of the micro-display and their respective location relative to the projection axis, etc.) Image correction engine 18 can use a variety of conventionally known methods to determine the keystone distortion based on the vertical and horizontal difference angles. One possible method, is to store pre-calculated image geometry corrections in a two dimensional look-up table using the vertical and horizontal difference angles as indices. Additional dimensions may be incorporated to include compensation for varying field of view and optical distortion with a zoom lens.

The geometrically pre-compensated digital image signal is then provided by image correction engine 18 to light engine 20 where the digital image is converted into an optical image. As conventionally known, light engine 20 comprises a light source (e.g. lamp or laser) and a display device (e.g. DLP, LCD, LCOS device) that either transmit or reflect light from the light source to create the desired optical image. The keystone compensated optical image is then projected onto the projection surface 7 (FIG. 1) through projection lens 22.

Direction sensor 26 is preferably a magneto-resistive compass device that senses absolute direction with respect to the Earth's magnetic north, but it should be understood that direction sensor 26 could also be an inertial device or any other device that can sense absolute direction. Directional sensor 26 is used to measure the horizontal angle of the axis of projection as will be described. Inclination sensor 28 is preferably an accelerometer, although inclination sensor 28 may be any device capable of sensing the angle of acceleration due to gravity. Inclination sensor 28 is used to measure the vertical angle of the axis of projection. Directional sensor 26 and inclination sensor 28 are mounted within keystone correction projector 10 such that they are positioned in a fixed manner in relation to projection lens 22. This direct coupling ensures that changes in the orientation of projection lens 22 (i.e. changes in the axis of projection) causes a like change in orientation of the sensors 26 and 28.

Directional sensor 26 and inclination sensor 28 sense the absolute horizontal and vertical direction, respectively, of the projection axis of projection lens 22 and provide MCU 24 with absolute direction data for projection lens 22. Depending on the sensed angular direction of projection lens 22, MCU 24 directs image correction engine 18 to execute the appropriate image warping function to appropriately pre-compensate for a specific condition of keystone distortion. vertical and horizontal difference angles (i.e. the horizontal and vertical keystone angles) of projection lens 22 are determined by comparing the instantaneous values sensed by directional sensor 26 and inclination sensor 28 with the respective horizontal and vertical zero references. In this way, keystone correction projector 10 then uses direction sensor 26 and inclination sensor 28 to perform simultaneous horizontal and vertical keystone correction.

Accordingly, MCU 24 acquires four values, all encoded as binary numbers, namely the vertical angle of the axis of projection as measured by inclination sensor 28, the zero reference for the vertical angle of the axis of projection (i.e. the constant vector of acceleration due to gravity), the horizontal angle of the axis of projection as measured by direction sensor 26, and the zero reference for the horizontal axis of projection, as obtained in any one of the methods detailed herein.

As discussed, the vertical difference angle is calculated by taking the angle difference of the vertical angle of the axis of projection and vertical zero reference. Also, the horizontal difference angle is calculated by taking the angle difference of horizontal angle of the axis of projection and the horizontal zero reference. It has been determined that the amount of keystone distortion may be completely and uniquely determined by the knowledge of the horizontal and the vertical keystone angles. The vertical zero reference is provided by the vector of acceleration due to gravity. The horizontal zero reference is established to the system through input device 30. Input device 30 may be a user keypad, an IR port or a DataComm port in accordance with the various approaches of the present invention for obtaining the horizontal zero reference.

First, the horizontal zero reference can simply be provided by the user as a specific compass direction through input device 30, wherein input device 30 is a conventional keypad.

Alternately, the horizontal zero reference is obtained by physically orienting correction projector 10 in a specific desired direction and causing the system to retain its instantaneously measured horizontal direction as the horizontal zero reference (i.e. while depressing an appropriate "perform measurement command " through the keypad). This can be accomplished by a user who simply makes an estimation of the horizontal level plane. That is the user would merely point correction projector 10 towards the projection surface 7 in approximately the correct direction for the desired horizontal zero reference, and actuate a horizontal reference entry control. Another, more accurate method of measuring a zero reference entry would be to construct the housing of correction projector 10 such that one side has a flat surface that may be physically placed against projection surface 7 such that correction projector 10 is positioned in a horizontal manner (i.e. orthogonal to the projection surface 7). While correction projector 10 is positioned in this way, the user would actuate a horizontal reference entry control (e.g. a dedicated keypad button on correction projector 10), and the instantaneous orientation of the projector would be measured by the on-board directional sensor 26 and stored in memory by MCU 24 as the horizontal reference.

Alternately, the horizontal zero reference may be received as a data communications signal through input device 30 where input device 30 is data receiving port (e.g. a Data-Comm or InfraRed receiver port, etc.) and desired to receive data communication signals from an external device. The horizontal zero reference provided within the data communications signal may derived from an external device, itself incorporating a directional sensor, and oriented in the desired direction of the horizontal zero reference.

Figure 8:
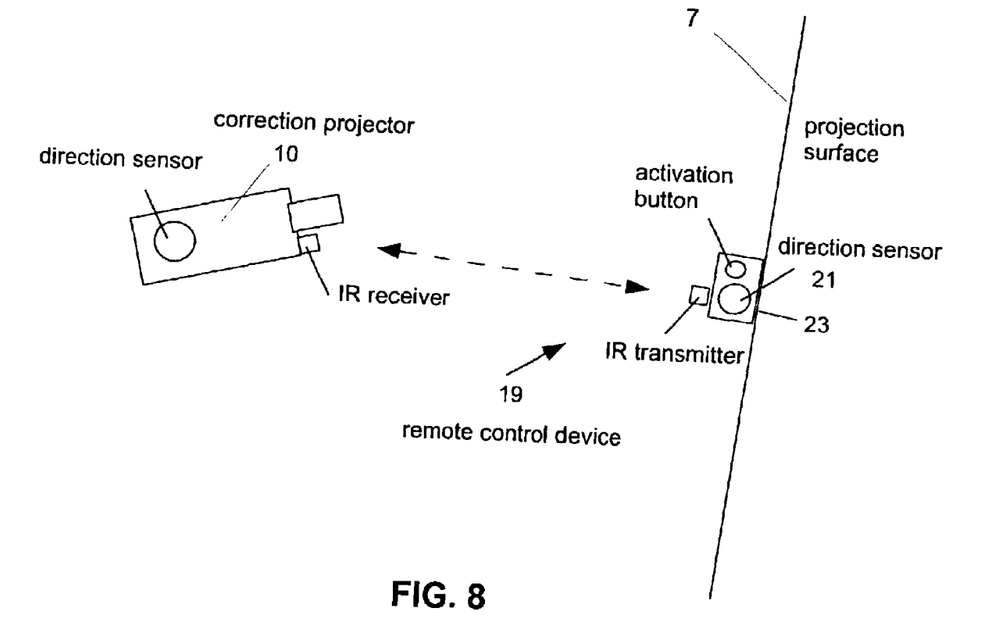
FIG. 8 is a schematic diagram of the correction projector of FIG. 7 used in association with a remote control device having a built-in direction sensor which is used to provide a zero reference signal to the correction projector.

FIG. 8 illustrates the preferred method for providing the zero reference through the use of an external signaling device. Specifically, a remote control device 19 is equipped with a directional sensor 21, and a flat reference surface 23 that is adapted for resting against the planar surface of projection surface 7, as shown. According to this method, the user places the flat reference surface 23 of remote control device 19 against the wall or projection surface 7, and simultaneously actuates a horizontal reference entry control (e.g. a dedicated remote control device keypad button). Remote control device 19 obtains its instantaneous direction from its internal direction sensor 21. Remote control device 19 then communicates this quantity to correction projector 10 for the MCU 24 to save as the projection device's new horizontal zero reference.

To provide responsive but stable operation, techniques are employed to detect fast changes to orientation but which are also tolerant to sensor noise and fluctuations in a fixed location.

Figure 9:
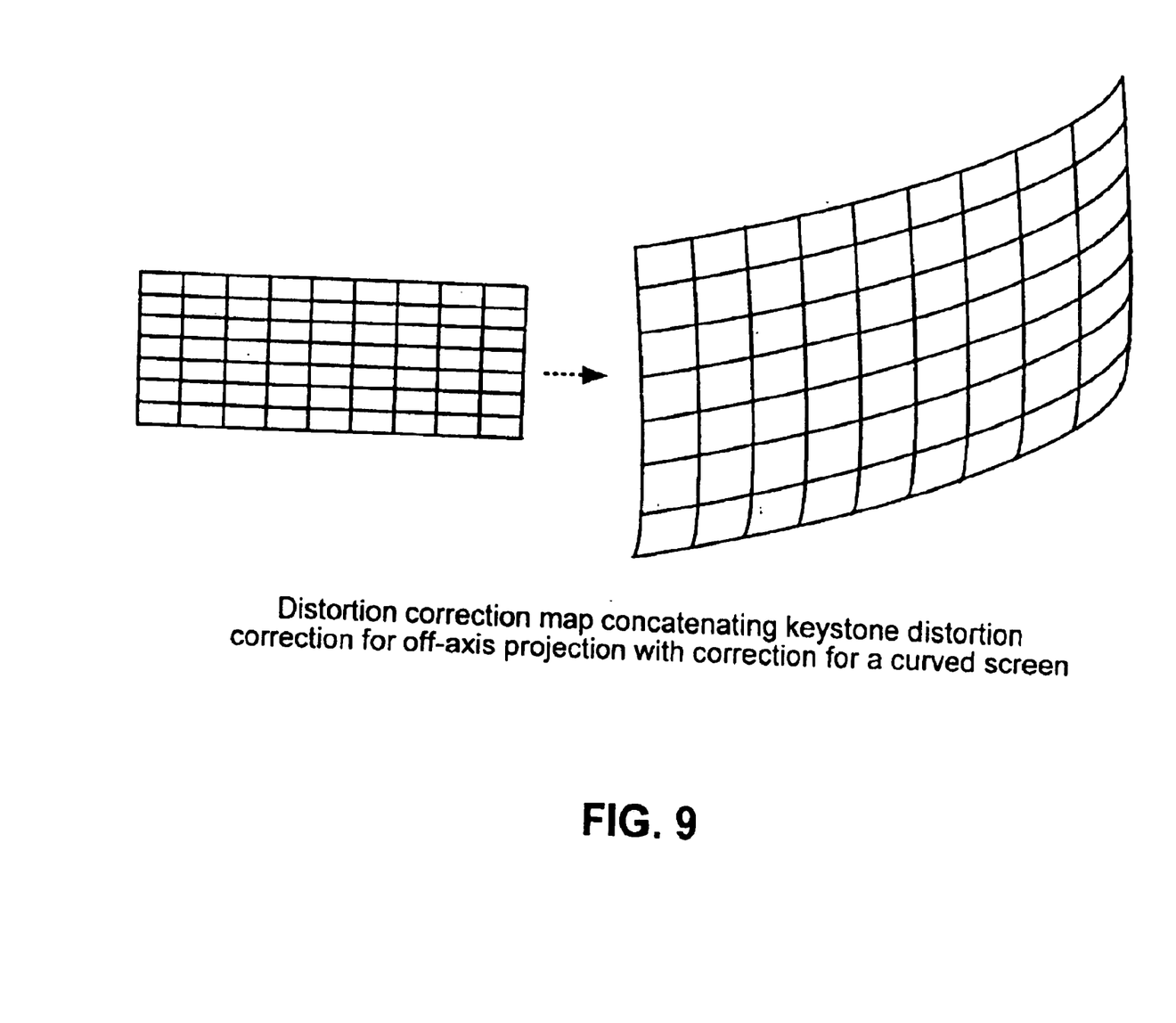
FIG. 9 is a diagram showing a distortion correction map concatenating keystone distortion correction for off-axis projection with correction for a curved screen.

It should be understood that projection surface 7 may be flat (FIG. 8) or curved (FIG. 9), or any other shape and that accordingly geometric engine 18 can provide compensating image warping functionality such that the image that is projected on projection surface 7 is free of keystone distortion. Additional, distortion and other optical parameters associated with the projection lens as well as variation of these parameters with zoom lenses, affects the geometry of the projected image. These optical parameters include the change in field of view and amount of distortion of the lens and the size and location of the micro-display relative, to the projection axis. Image correction engine 18 can provide compensation for these effects simultaneously with the keystone compensation data discussed above by combining appropriate lens and other optical compensation related data with the keystone geometry correction data). Also, it is contemplated that image correction engine 18 can be adapted to simultaneously correct for the above-discussed luminance variations that result from keystone effects by adding associated luminance compensation data with the keystone compensation data. The luminance compensation data modulates the image brightness level.

As will be apparent to those skilled in the art, various modifications and adaptations of the structure described above are possible without departing from the present invention, the scope of which is defined in the appended claims.

What is claimed is:

1. A projection method for automatically correcting keystone distortion within an optical image that is projected onto a projection surface through a projection lens having a projection axis that is oriented in a direction that is off-axis from the surface normal of the projection surface, said projector method comprising the steps of:

(a) obtaining input image data representing the optical image to be displayed;

(b) determining the absolute horizontal direction of the projection axis, the absolute vertical direction of the projection axis, a vertical zero reference and a horizontal zero reference by:

(i) positioning a directional device against the projection surface, said directional device being adapted to provide a data signal that contains the horizontal zero reference;

(i) receiving the data signal from the directional device and determining the horizontal zero reference from the data signal;

(c) calculating the vertical difference angle by subtracting the vertical zero reference from the absolute vertical direction of the projection axis and the horizontal difference angle by subtracting the horizontal zero reference from the absolute horizontal direction of the projection axis;

(d) determining the keystone distortion based on the vertical difference angle and the horizontal difference angle; and (e) applying geometric correction to the image data proportional and inverse to said keystone distortion such that the projected image is free from keystone distortion.

2. The projection method of claim 1, wherein the determination of the vertical zero reference in (b) consists of determining the constant vector of acceleration due to gravity.

3. The projection method of claim 1, wherein determination of the vertical zero reference in (b) is accomplished by positioning the projection lens in a substantially horizontal perpendicular direction and instantaneously measuring the horizontal direction and recording it as the horizontal zero reference.

4. The projection method of claim 1, wherein the projection surface is curved and wherein the method further includes concatenating the distortions caused by the shape of the projection surface with said keystone distortion, and applying a correction to the image data that is proportional and inverse to the combined distortions, such that, the resulting projected image is visually distortion free.

5. The projection method of claim 1, wherein the method further includes concatenating the distortions caused by zooming variations, including changes in the field of view, size of the distortions, and location of a micro-display device relative to the projection surface with said keystone distortion, and applying a correction to the image data proportional and inverse to the combined distortions, such that the resulting projected image is visually distortion free.

6. The projection method of claim 1, wherein (b) further comprises determining the absolute horizontal direction of the projection axis using a magneto-resistive compass device.

7. The projection method of claim 1, wherein (b) further comprises determining the absolute horizontal direction of the projection axis using an inertial device.

8. A projection assembly for automatically correcting keystone distortion within an optical image that is projected onto a projection surface based on image data, said projector assembly comprising:

(a) a projection lens having a projection axis that is oriented in a direction that is off-axis from the surface normal of the projection surface;

(b) an inclination sensor coupled to the projection lens in a fixed manner for measuring the absolute vertical direction of the projection axis and a vertical zero reference and a directional sensor coupled to the projection lens and to the inclination sensor in a fixed manner for measuring the absolute horizontal direction of the projection axis;

(c) an input communications device for receiving a horizontal zero reference;

(d) a directional device adapted to be positioned against the projection surface, said directional device including a direction sensor for measuring the horizontal zero reference and signaling means for providing said input communication device with a data signal that includes the horizontal zero reference;

(e) a processor coupled to said directional sensor, said inclination sensor, and said input communications device, said processor being adapted to determine the vertical difference angle by calculating the difference between the absolute vertical direction of the projection axis and the vertical zero reference and the horizontal difference angle by calculating the difference between the absolute horizontal direction of the projection axis and the horizontal zero reference and further adapted for calculating the keystone distortion based on the vertical difference angle and the horizontal difference angle;

(f) an image correction engine applying geometric correction to the image data proportional and inverse to said keystone distortion such that the projected image is free from keystone distortion.

9. The projector assembly of claim 8, wherein the vertical zero reference is the constant vector of acceleration due to gravity.

10. The projection assembly of claim 8 further comprising an external data processing device selected from the group consisting of: a computer, a handheld personal digital assistant, an infrared remote control unit, said external data processing device being adapted to provide said at least one of said vertical zero reference and said horizontal zero reference to said communication device.

11. The projection assembly of claim 8, wherein the projection surface is curved, and wherein said processor is further adapted to concatenate the distortions caused by the shape of the projection surface with said keystone distortion, and to apply a correction to the image data that is proportional and inverse to the combined distortions, such that, the resulting projected image is visually distortion free.

12. The projection assembly of claim 8, wherein said processor is further adapted to concatenate the distortions caused by zooming variations, including changes in the field of view, size of the distortions, and location of a micro-display device relative to the projection surface with said keystone distortion, and to apply a correction to the image data proportional and inverse to the combined distortions, such that the resulting projected image is visually distortion free.

13. The projection assembly of claim 8, wherein the directional sensor is a magneto-resistive compass device.

14. The projection assembly of claim 8, wherein the directional sensor is an inertial device.

* * * * *